(12) United States Patent
Fauteux

(10) Patent No.: US 10,058,213 B2
(45) Date of Patent: Aug. 28, 2018

(54) AUTOMATED SELF-CONTAINED COOKING ASSEMBLY

(71) Applicant: Lucien Fauteux, Fulford (CA)

(72) Inventor: Lucien Fauteux, Fulford (CA)

(*) Notice: Subject to any disclaimer, the term of this patent is extended or adjusted under 35 U.S.C. 154(b) by 841 days.

(21) Appl. No.: 14/534,694

(22) Filed: Nov. 6, 2014

(65) Prior Publication Data

US 2015/0128816 A1    May 14, 2015

Related U.S. Application Data

(60) Provisional application No. 61/900,839, filed on Nov. 6, 2013.

(51) Int. Cl.
*A47J 37/12* (2006.01)

(52) U.S. Cl.
CPC ....... *A47J 37/1223* (2013.01); *A47J 37/1228* (2013.01)

(58) Field of Classification Search
CPC . A47J 37/1228; A47J 37/1223; A47J 37/1266
USPC .................. 99/403, 407, 330, 408
See application file for complete search history.

(56) References Cited

U.S. PATENT DOCUMENTS

| | | | | |
|---|---|---|---|---|
| 4,457,947 A * | 7/1984 | Schmidt | ............. | A47J 37/1233 426/438 |
| 4,489,646 A * | 12/1984 | Schmidt | ............. | A47J 37/1233 426/438 |
| 4,785,725 A * | 11/1988 | Tate | ............. | A47J 37/1228 169/23 |
| 4,900,341 A * | 2/1990 | Csabai | ............. | A47J 37/1214 126/299 E |
| 4,941,400 A * | 7/1990 | Moore | ............. | A47J 27/0817 126/299 R |
| 5,063,906 A * | 11/1991 | Rogers | ............. | B03C 3/017 126/299 D |
| 5,125,328 A * | 6/1992 | Grandi | ............. | A21B 3/07 126/299 D |
| 5,313,876 A * | 5/1994 | Hilger | ............. | A47J 27/18 126/374.1 |
| 5,586,486 A * | 12/1996 | Nitschke | ............. | A47J 37/1228 99/330 |
| 5,671,726 A * | 9/1997 | Hsu | ............. | F24C 15/2042 126/299 D |
| 5,722,289 A * | 3/1998 | Carr | ............. | A47J 37/1266 73/302 |

(Continued)

*Primary Examiner* — Dana Ross
*Assistant Examiner* — Lawrence Samuels
(74) *Attorney, Agent, or Firm* — Praxis

(57) ABSTRACT

A cooking assembly comprises a container for receiving cooking fluid therein and comprising a vat and a reserve tank in fluid communication with the vat such that overflow of cooking fluid from the vat flows into the reserve tan. The vat provides for cooking food products therein. The reserve tank includes at least a two stage filter for filtering the cooking fluid overflow so as to return it back to the vat. A mobile basket provides for receiving food product and positioning it within the cooking vat and removing it therefrom when cooked. A three stage air filtering system is provided for suctioning air above the container during cooking and filtering it to provide clean air to the outside of the assembly. The assembly can be provided in a single enclosed unit with an in-feed for food products and an out-feed to discharge cooked food products therefrom.

13 Claims, 13 Drawing Sheets

(56) References Cited

U.S. PATENT DOCUMENTS

| | | | |
|---|---|---|---|
| 9,528,510 B2 * | 12/2016 | Tiszai | A47J 37/1223 |
| 2007/0137497 A1 * | 6/2007 | Savage | A47J 37/1223 99/403 |
| 2010/0326288 A1 * | 12/2010 | Tiszai | A47J 37/1223 99/355 |

* cited by examiner

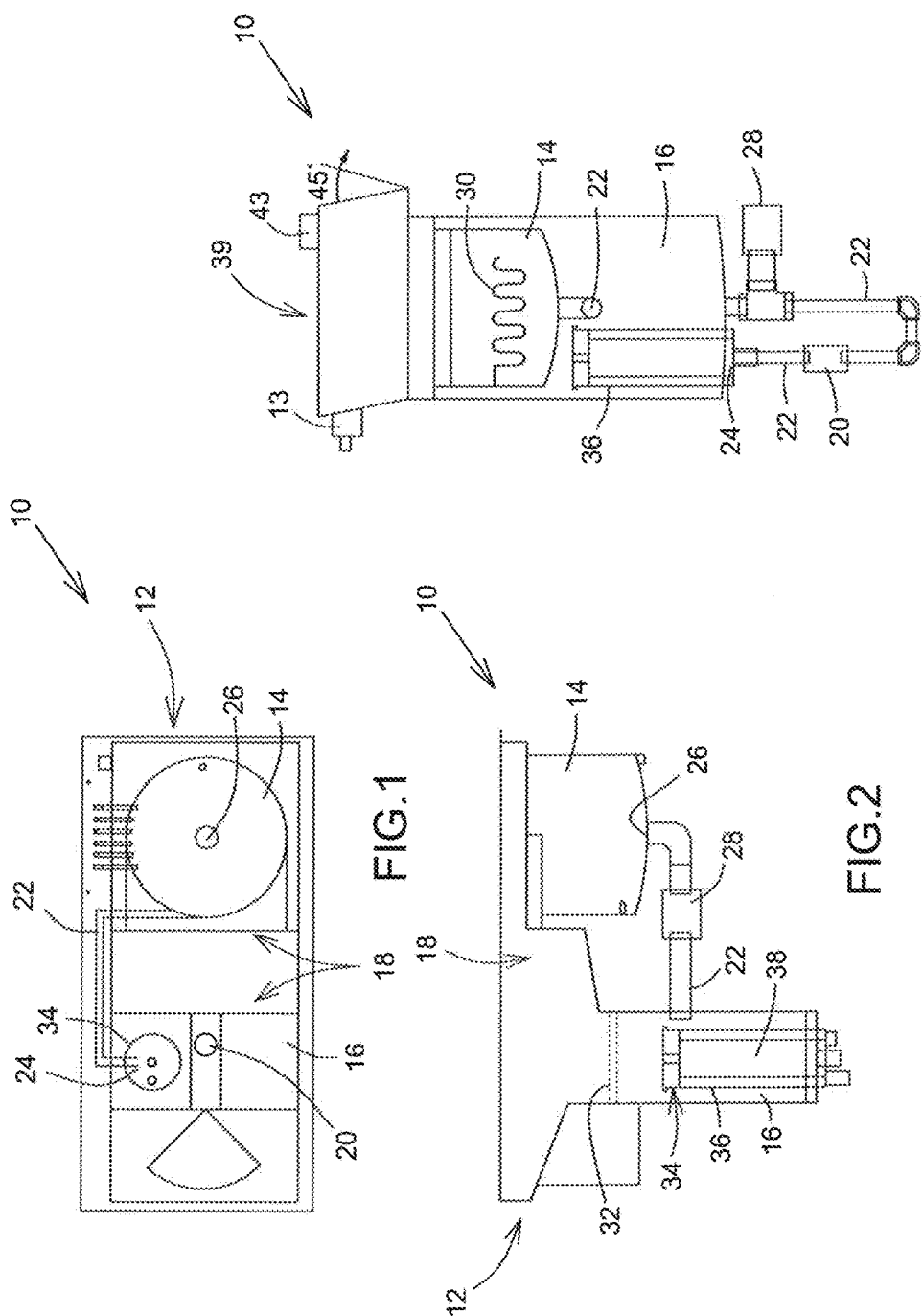

AUTOMATED SELF-CONTAINED COOKING ASSEMBLY

CROSS-REFERENCE TO RELATED APPLICATIONS

The present application request priority on U.S. Provisional Patent Application No. 61/900,839 filed on Nov. 6, 2013 and incorporated herein by reference in its entirety.

TECHNICAL FIELD

The present disclosure relates to cooking devices. More particularly, but not exclusively, the present disclosure relates to an assembly for cooking and dispensing food product such as "frozen" French fries, filets, nuggets, egg rolls and the like. Still more particularly, and still not exclusively, the present disclosure relates to an automated self-contained cooking assembly.

BACKGROUND

There are many devices for preparing hot food products such as fried fish, French fried potatoes, potato chips, chicken fingers, and the like. For example, there has been provided a basket assembly for an apparatus for cooking and dispensing hot food products. The assembly may be incorporated into a vending machine and includes a carrousel container. The carrousel container receives food product and rotates about a vertical axis. The food product is held by by a receptacle within the carrousel container and is progressively cooked in a hot liquid such as water or oil. Once food product is cooked, the assembly is raised and food product is discharged. The time taken in order to cook a food product with known devices may also be too long to be of practical value and faster serving processes may deteriorate the cooking oil and adversely affect the food product.

The use of baskets with open vat fryers shortens the life of oil due to aeration, salting, residual particles in oil, hot spots and scorching on elements. The foregoing results in poor quality of food, higher oil absorption in product and more frequent oil changes.

There are known devices that use an enclosed kitchen, an air filter system and pre-timed basket lift for use in non-ventilated zones. Other devices use a conveyor type system. These devices require a high frequency of maintenance and the quality of the finished product is inconsistent. They also cannot provide a mixed serving of product (fries & nuggets) within an acceptable time-frame to the customer. These devices are labor intensive to operate and maintain and do not provide a diagnostic analysis for trouble shooting, oil, filter changes, etc. and remote control of all facets of the appliance. Also, these devices do not have the design capabilities for converting to a vending type dispensing machine.

Conventional open-vat fryers are used in most fast-food operations. This known technology consists of a rectangular tank with a heating element at the bottom. There are two baskets used to manually load and unload product. In order to meet peak demand, an optimum oil capacity to power input ratio must be met. For example, a high-production fryer will contain 30 lbs of shortening with an input of 16 kW. This will produce approximately 60 lbs. of fries or 240 (4 oz.) portions per hour. The by-products of this type of frying includes high-energy costs, pollutant exhaust, frequent oil changes, labor intensive operations high capital for equipment, high insurance cost etc.

OBJECTS

An object of the present disclosure is to provide an automated self-contained cooking assembly.

An object of the present disclosure is to provide an automated self-contained cooking apparatus.

An object of the present disclosure is to provide a method for cooking a food product.

An object of the present disclosure is to provide a kit of an automated self-contained cooking assembly.

An object of the present disclosure is to provide a system for monitoring and controlling an automated self-contained cooking assembly.

SUMMARY

In accordance with an aspect of the present disclosure, there is provided a cooking assembly comprising: a container for receiving cooking fluid therein and comprising a vat and a reserve tank in fluid communication with the vat such that overflow of cooking fluid from the vat flows into the reserve tank; a heating element mounted within the vat for heating the cooking fluid therein for cooking a food product; a filtering system mounted within the reserve tank for filtering the cooking fluid received from the vat; and a conduit in fluid communication with the reserve tank and the reserve tank for selectively returning the cooking fluid to the vat from the reserve tank, thereby causing cooking fluid in the vat prior to the returned cooking fluid to overflow from the vat into the reserve tank, wherein the cooking fluid returning to the vat from the reserve tank has not been heated within the reserve tank subsequently to having been heated by the heating element in the vat and has been filtered by the filtering system.

In an embodiment, the heating element is configured to provide uniform heat density throughout the vat.

In an embodiment, the filtering system includes a sieve for catching particles from the oil flowing from the vat. In an embodiment, the filtering system includes oil filter canister containing a cotton cartridge for filtering the oil.

In an embodiment, the assembly further comprises a baffle filter for receiving and filtering the air above the container during cooking. In an embodiment, the assembly further comprises a condenser in fluid communication with the baffle filter for condensing the air received from the baffle filter. In an embodiment, the condenser comprises a scrubbing tower for passing the air from the baffle filter therethrough, the scrubbing tower defining a channel containing therein condensing elements, a water circuit being positioned above the condensing element for spraying the condensing elements with water. In an embodiment, the scrubbing tower has a central channel for passing the air from the baffle filter therethrough towards a floor of the scrubbing tower, and an outer channel containing the condensing elements for receiving the air from the floor therethrough thereby providing the air from the floor to drop in temperature and be filtered by the condensing elements. In an embodiment, the condensing elements are glass marbles. In an embodiment, the assembly further comprises a pump for pumping water from the floor of the scrubbing tower through a chiller for re-spraying the water on the condensing elements. In an embodiment, the assembly further comprises a carbon filter in fluid communication with the condenser for filtering the air received from the condenser. In an embodiment, the carbon filter comprises a container and carbon therein providing for absorption of particles in the air passing therethrough. In an embodiment the charcoal is activated charcoal.

In an embodiment, the above assembly further comprises a basket assembly, the basket assembly comprising a movable basket for receiving food product therein, the movable basket being automatically movable into and out of the vat.

In accordance with an aspect of the present disclosure, there is provided a cooking apparatus comprising: a housing including an inlet for receiving food product and an outlet for dispensing cooked food product; the cooking assembly described above in accordance with an aspect of the disclosure and the alternative embodiments thereof mounted within the housing; and a movable basket housed within the housing for receiving food product from the inlet and for moving the food product therein in and out of the vat and for moving the cooked food product to the outlet for dispensing thereof.

In accordance with an aspect of the present disclosure, there is provided a cooking assembly comprising: a container for receiving cooking fluid therein for being heated so as to cook a food product; and a multi-stage filtering system comprising: a baffle filter so positioned relative to the container for receiving and filtering the air above the container during cooking; a condenser in fluid communication with the baffle filter for condensing the air received from the baffle filter; and a carbon filter in fluid communication with the condenser for filtering the air received from the condenser.

In an embodiment, the container comprises a vat and a reserve tank in fluid communication with the vat such that overflow of cooking fluid from the vat flows into the reserve tank, the cooking assembly further comprising: a heating element mounted within the vat for heating the cooking fluid therein for cooking a food product; and a conduit in fluid communication with the reserve tank and the reserve tank for selectively returning the cooking fluid to the vat from the reserve tank, thereby causing cooking fluid in the vat prior to the returned cooking fluid to overflow from the vat into the reserve tank, wherein the cooking fluid returning to the vat from the reserve tank has not been heated within the reserve tank subsequently to having been heated by the heating element in the vat and has been filtered by the multi-stage filtering system.

In an embodiment, the assembly further comprises a basket assembly, the basket assembly comprising a movable basket for receiving food product therein, the movable basket being automatically movable into and out of the vat.

In an embodiment, the condenser comprises a scrubbing tower for passing the air from the baffle filter therethrough, the scrubbing tower defining a channel containing therein condensing elements, a water circuit being positioned above the condensing element for spraying the condensing elements with water. In an embodiment, the scrubbing tower has a central channel for passing the air from the baffle filter therethrough towards a floor of the scrubbing tower, and an outer channel containing the condensing elements for receiving the air from the floor therethrough thereby providing the air from the floor to drop in temperature and be filtered by the condensing elements. In an embodiment, the condensing elements are glass marbles. In an embodiment, the assembly further comprises a pump for pumping water from the floor of the scrubbing tower through a chiller for re-spraying the water on the condensing elements.

In an embodiment, the carbon filter comprises a container and carbon therein providing for absorption of particles in the air passing therethrough. In an embodiment, the charcoal is activated charcoal.

In accordance with an aspect of the present disclosure, there is provided a cooking apparatus comprising: a housing including an inlet for receiving food product and an outlet for dispensing cooked food product; the cooking assembly described above in accordance with aspect of the disclosure and the alternative embodiments thereof mounted within the housing; and a movable basket housed within the housing for receiving food product from the inlet and for moving the food product therein in and out of the vat and for moving the cooked food product to the outlet for dispensing thereof.

In accordance with an aspect of the present disclosure, there is provided a cooking assembly comprising: a container for receiving cooking fluid therein and comprising a vat and a reserve tank in fluid communication with the vat such that overflow of cooking fluid from the vat flows into the reserve tank; a heating element mounted within the vat for heating the cooking fluid therein for cooking a food product; a filtering system mounted within the reserve tank for filtering the cooking fluid received from the vat; a conduit in fluid communication with the reserve tank and the reserve tank for selectively returning the cooking fluid to the vat from the reserve tank, thereby causing cooking fluid in the vat prior to the returned cooking fluid to overflow from the vat into the reserve tank, wherein the cooking fluid returning to the vat from the reserve tank has not been heated within the reserve tank subsequently to having been heated by the heating element in the vat and has been filtered by the filtering system; and a multi-stage filtering system comprising: a baffle filter positioned above the container for receiving and filtering the air above the container during cooking; a condenser in fluid communication with the baffle filter for condensing the air received from the baffle filter; and a carbon filter in fluid communication with the condenser for filtering the air received from the condenser.

In accordance with an aspect of the present disclosure, there is provided a cooking apparatus comprising: a housing including an inlet for receiving food product and an outlet for dispensing cooked food product; the cooking assembly described above in accordance with aspect of the disclosure and the alternative embodiments thereof mounted within the housing; and a movable basket housed within the housing for receiving food product from the inlet and for moving the food product therein in and out of the vat and for moving the cooked food product to the outlet for dispensing thereof.

In accordance with an aspect of the present disclosure, there is provided a method of cooking food product comprising: providing cooking fluid within a vat; providing the vat to be in fluid communication with a reserve tank such that overflow of cooking fluid from the vat flows into the reserve tank; uniformly heating the cooking fluid within the vat for cooking the food product; filtering the overflowing cooking fluid received from the vat within the reserve tank; returning the cooking fluid to the vat from the reserve tank, thereby causing cooking fluid in the vat prior to the returned cooking fluid to overflow from the vat into the reserve tank, wherein the cooking fluid returning to the vat from the reserve tank has not been heated within the reserve tank subsequently to having been heated by the heating element in the vat and has been filtered by the filtering system.

In accordance with an aspect of the present disclosure, there is provided a method of cooking food product comprising: providing cooking fluid within a container; uniformly heating the cooking fluid within the vat for cooking the food product; suctioning the air above the container during cooking thought a baffle for filtering thereof; condensing the air after it has been filtered by the baffle; filtering the condensed air via a carbon filter in fluid communication with the condenser.

In accordance with an aspect of the present disclosure, there is provided a system of monitoring a cooking assembly comprising: the cooking assemblies defined herein in accordance with aspects of the present disclosure and the alternative embodiments thereof; a controller linked to the cooking assembly for receiving and transmitting control data therefrom.

In accordance with an aspect of the present disclosure, there is provided a kit for cooking food product comprising: the cooking assemblies defined herein in accordance with aspects of the present disclosure and the alternative embodiments thereof; and a housing for mounting the cooking assembly or portions thereof thereto.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 1 is a top view of the self-contained cooking assembly in accordance with a non-restrictive illustrative embodiment of the present disclosure;

FIG. 2 is a front view of the self-contained cooking assembly of FIG. 1;

FIG. 3 is a front view of the self-contained cooking assembly of FIG. 1;

DETAILED DESCRIPTION

Generally stated and in accordance with an embodiment, there is provided a cooking assembly comprising a container for receiving cooking fluid therein and comprising a vat and a reserve tank in fluid communication with the vat such that overflow of cooking fluid from the vat flows into the reserve tank. The vat provides for cooking food products therein. The reserve tank includes at least a two stage filter for filtering the cooking fluid overflow and returning it back to vat. A mobile basket provides for receiving food product and positioning it within the cooking vat and removing it therefrom when cooked. A three stage air filtering system is provided for suctioning air above the container during cooking and filtering it to provide clean air outside the assembly. The assembly can be provided in a single enclosed unit with an in-feed for food products and an out-feed to discharge cooked food products therefrom.

In an embodiment, the food product is frozen food product. In an non-limiting illustrative embodiment, the frying temperature is about 385° C.

With reference, to the appended Figures, non-restrictive illustrative embodiments will be herein described so as to further exemplify the disclosure only and by no means limit the scope thereof.

FIGS. 1-4 are schematic representations of the assembly 10 of the disclosure in accordance with an illustrative embodiment. FIGS. 1-4 will be discussed with reference to FIGS. 5-23.

Figure 4:
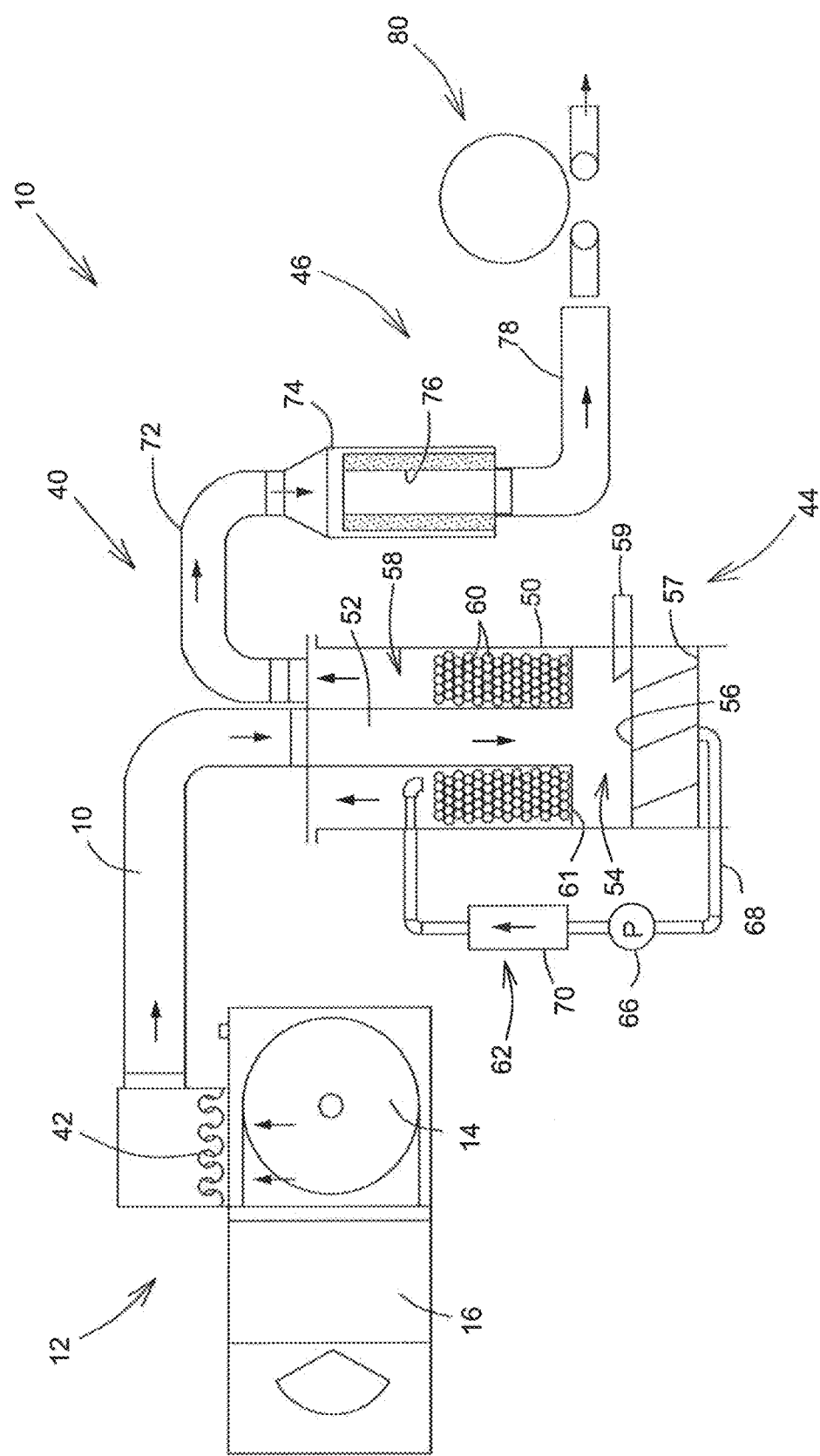
FIG. 4 is a schematic view of the self-contained cooking assembly of FIGS. 1-3 in accordance with a non-restrictive illustrative embodiment of the present disclosure.
Figure 5:
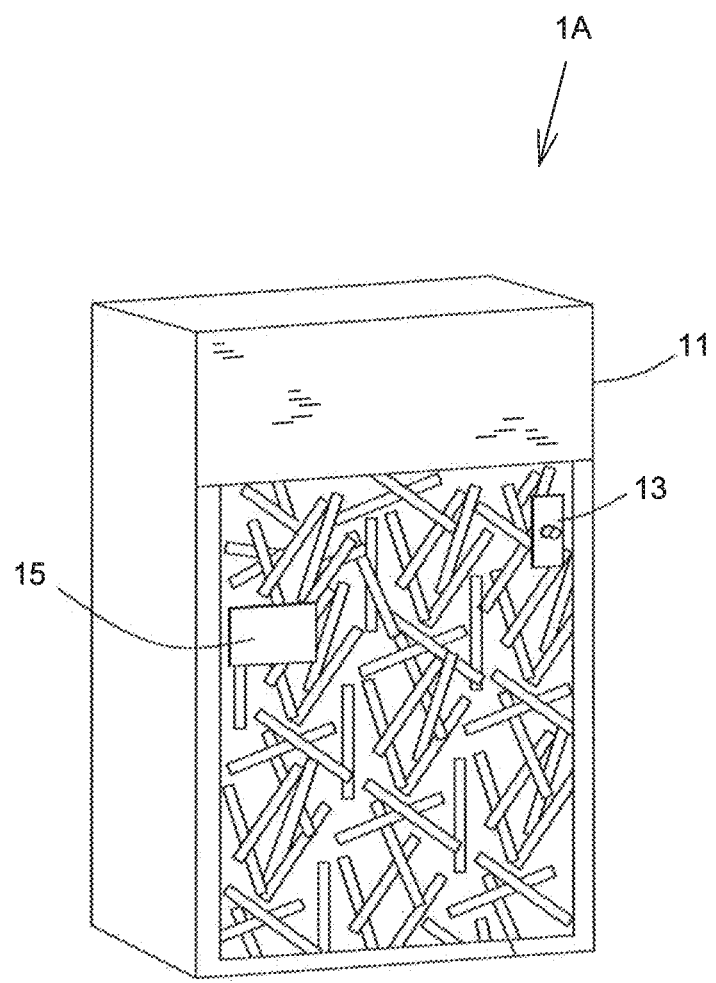
FIG. 5 is a perspective front view of the self-contained cooking apparatus in accordance with a non-restrictive illustrative embodiment of the present disclosure housing the self-contained cooking assembly of FIGS. 1-4.
Figure 6:
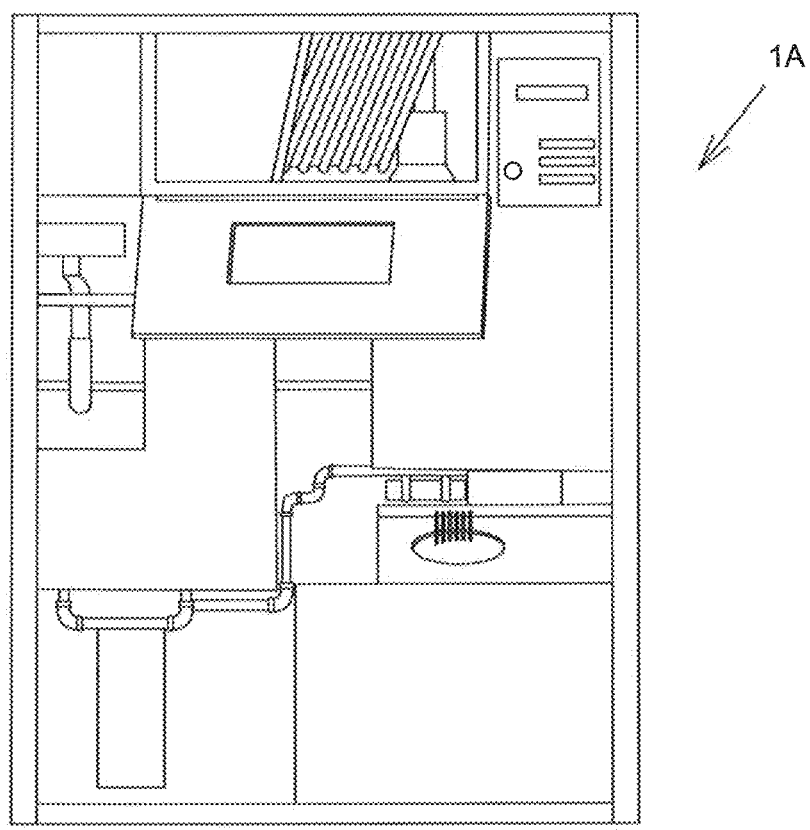
FIG. 6 is rear view of the self-contained cooking apparatus of FIG. 5.
Figure 7:
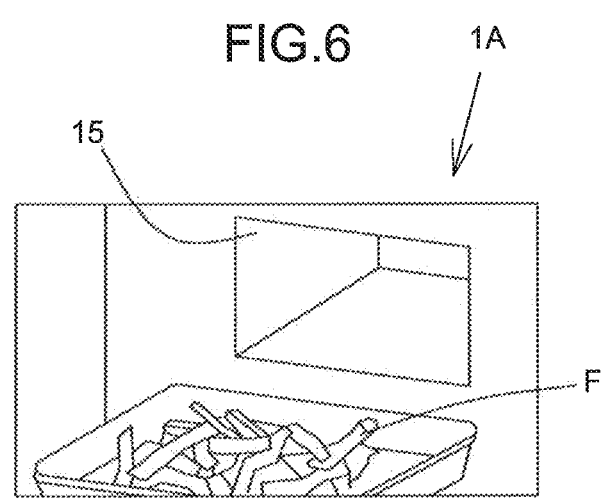
FIG. 7 is perspective vie of the discharge outlet of the self-contained cooking apparatus of FIG. 5.

FIGS. 5-7 show a self-contained cooking apparatus 1A that comprises a housing 11 for housing therein the assembly 10 described in FIGS. 1-4. The housing 11 includes a control panel 13. The finalized cooked food product F is retrieved from an output slot 15 shown 7.

FIGS. 8-22 show a self-contained cooking apparatus 1B that also includes a housing 11 for housing therein the assembly 10 described in FIGS. 1-4. The housing 11 includes a frame structure 11F for mounting the various components of the assembly 10 thereon. Food product is introduced into the apparatus 1B via an inlet 43 (see FIGS. 3, 10, 12 and 13).

Apparatus 1A and 1B are similar to each other and as such will be reference to during the description of assembly 10.

With reference to FIGS. 1-4, and 8-12, the assembly 10 includes an oil container 12 comprising an oil vat 14 and an oil reserve tank 16 in fluid communication with the oil vat 14 via a passage 18. The oil vat 14 is purposely designed for oil overflow to, continuously and automatically, flow into the larger reserve tank 16. In an embodiment, the oil vat 14 comprises a cylindrical configuration that substantially eliminates hot spots, requires less oil than conventional rectangular open vat fryers and also maintains optimum temperatures. As such, vat 14 requires less maintenance than conventional oil vats and extends the oil life.

Figure 11:
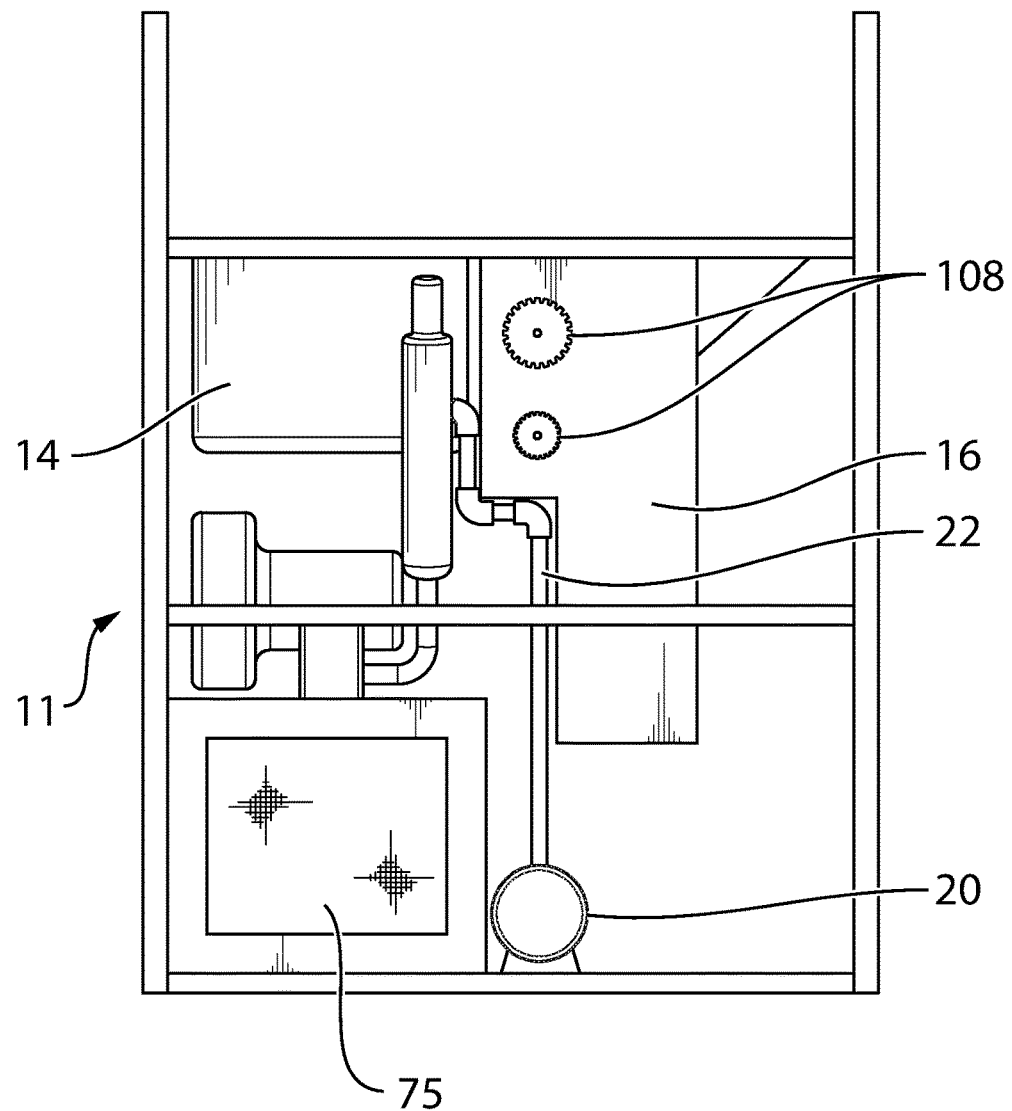
FIG. 11 is a perspective view of the self-contained cooking apparatus of FIG. 8 in yet another partially disassembled condition.

FIGS. 2, 3 and 11 show a pump 20 mounted to a conduit 22 provides for selectively pumping oil from the oil reserve tank 16 back into the oil vat 14 via the conduit 22, which extends from an inlet 24 at the reserve tank 16 to an outlet 26 at the bottom of the oil vat 24. The conduit 22 includes a valve 28 which allows emptying the oil vat 14 during cleaning, for example.

FIGS. 1, 3, and 18-20, show a heating element, generally denoted 30 positioned within the oil vat 14. In the example of FIG. 3, the heating element 30 is flat wavy or sinusoidal rod that provides for increasing the heating surface thereby decreasing the amount of hot spots within the oil, namely areas that are hotter than the rest of the oil within the oil vat 14. These hot spots deteriorate the oil. As such, the heat density is more uniform throughout the oil in the oil vat 14 and the quality of the oil is not compromised during heating. In the example shown in FIG. 20, the heating element 30 has a spiral configuration, flowing along the inner sunk periphery 14P of the oil vat 14, which is shallow so as to uniformize heating of the oil and avoid hot spots.

The reserve tank 16 does not include a heating element and as such, oil therein which was received from the oil vat 14 not only did not have enough time to be overheated within the oil vat 14 (because it is substantially pushed out after each cooking cycle), but also substantially maintained its optimum frying temperature. After each cooking cycle this oil from the reserve tank 16 is pumped, by pump 20 and via conduit 22, into the oil vat 14. In an embodiment, the reserve tank 16 may also allow the oil to cool down if such cooling is needed. This oil is pumped into the oil vat 14 via the inlet 26 which is at the side of the oil vat 14, thereby consequently pushing heated oil from the top of the oil vat 14 into the reserve tank 16 by way of passage 18. This heated oil is no longer subject to heat within the reserve tank 16 and is progressively re-pumped into the oil vat 14 after the subsequent cooking cycle. In this way, overheating of the oil within the oil vat 14 is avoided as it is constantly replenished with oil after each cooking cycle.

Figure 8:
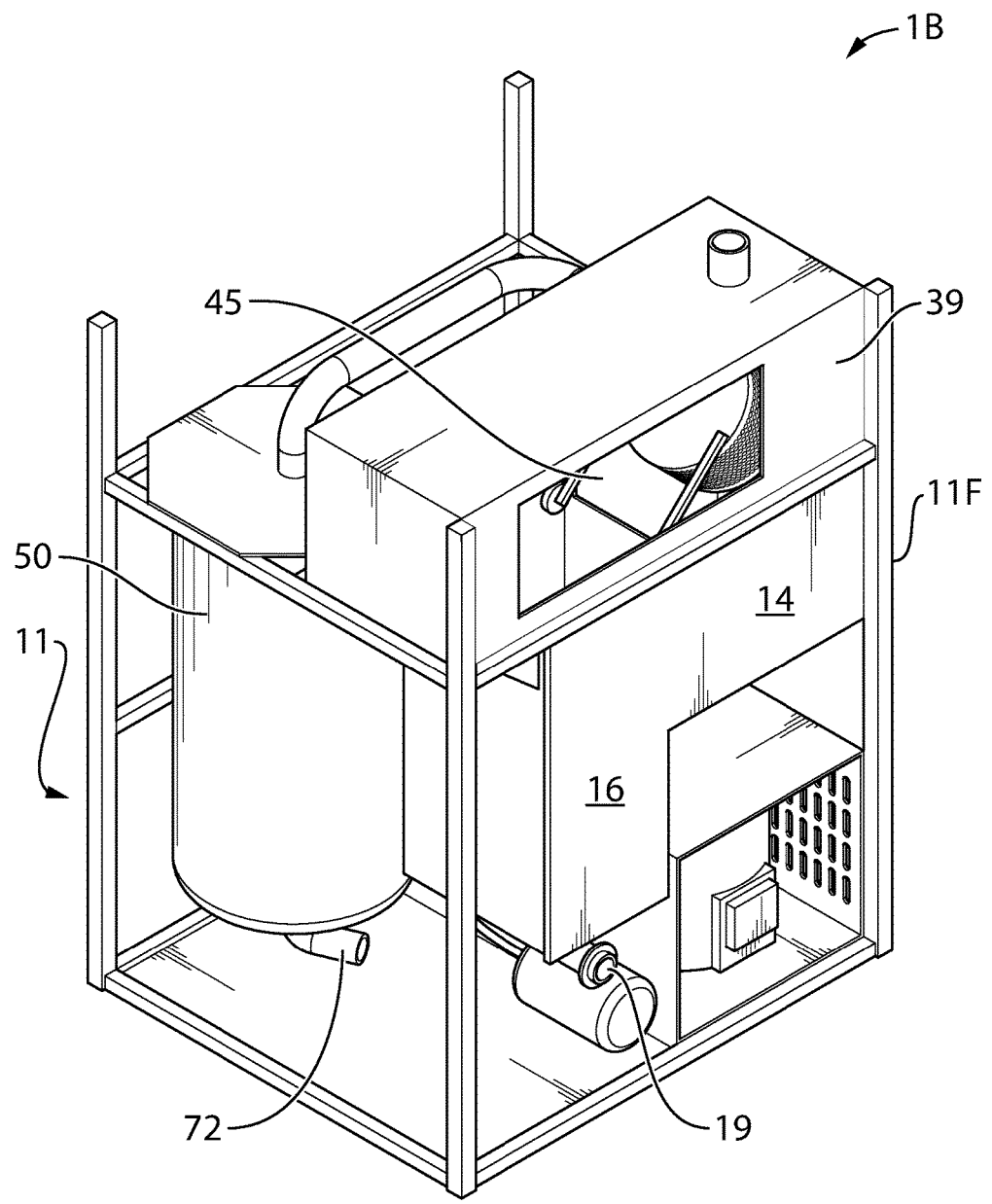
FIG. 8 is a perspective view of a self-contained cooking apparatus including the self-contained cooking assembly of FIGS. 1-4 in accordance with a non-restrictive illustrative embodiment of the present disclosure and being shown in a partially disassembled condition.

As shown in FIG. 8, the reserve tank 16 includes a main drain 19 for being drained of its contents.

With reference to FIG. 2, the reserve tank 16 includes a sieve such as screen 32 at is receiving mouth that is positioned above the oil contained therein. Oil overflow being directed by passage 18 from the oil vat 14 to the reserve tank 16 passes through the screen 32 for catching particles such crumbs, sediment and other products floating in the oil contained in the oil vat 14. In this way, particles are constantly removed from the oil vat 14 since such products cause the oil to deteriorate. As such, the straining of the continuous overflow of oil from the oil vat 14 as it is replenished with oil after each cooking cycle also replenishes the oil vat 14 with cleaner strained oil, free of crumbs.

FIG. 3 shows the reserve tank 16 including a filter 34 positioned therein and mounted at the bottom of the tank 16. The filter 34 comprises an oil filter canister 36 containing a cotton cartridge 38, for example a 10 micro cotton cartridge. Oil within the tank 16 flows into the filer 34 to be filtered thereby and flows from bottom of the filter 34 into the conduit 22 via the inlet 24 thereby replenishing the oil vat 14 with, strained, and filtered oil after each cooking cycle.

Figure 9:
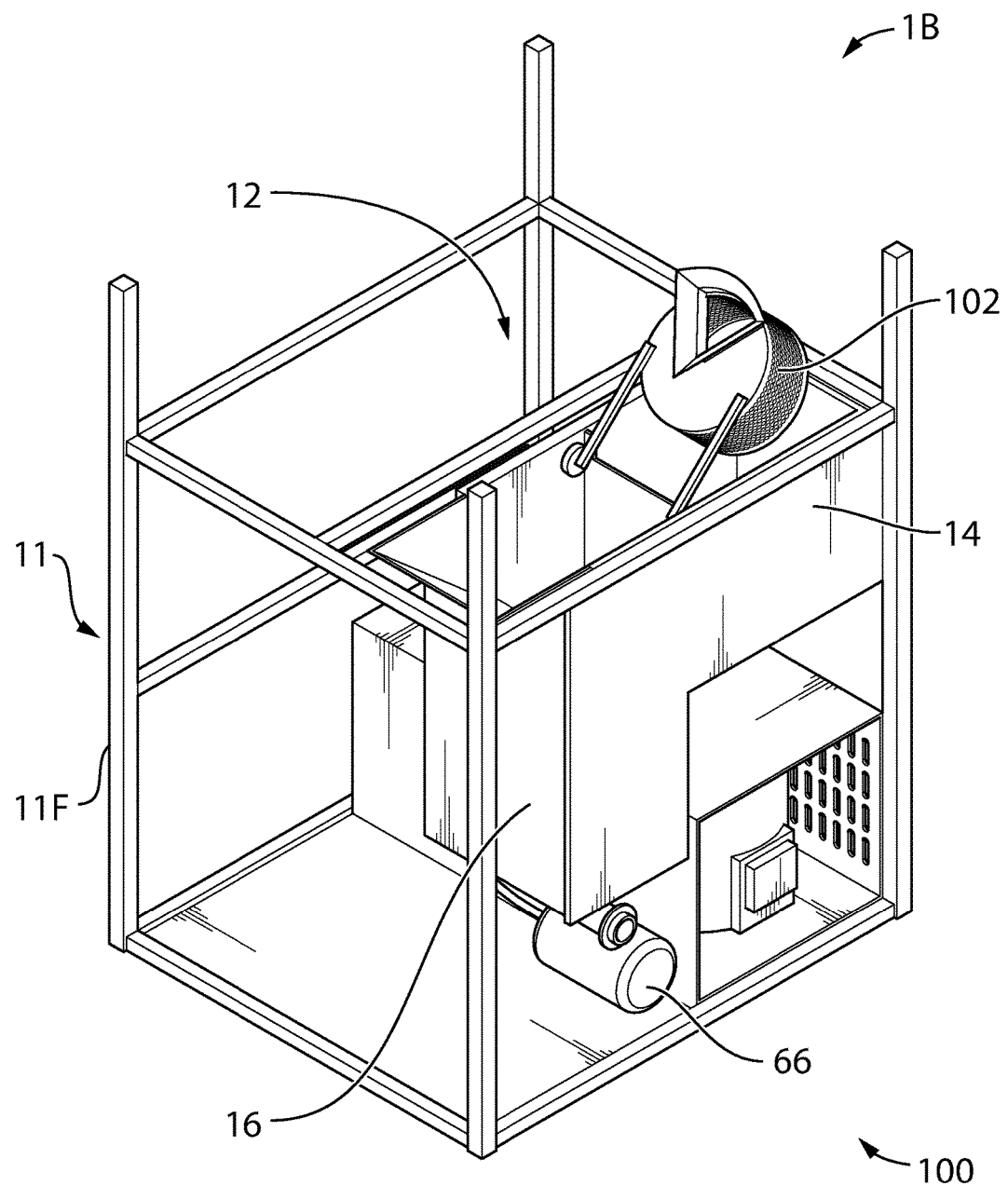
FIG. 9 is a perspective view of the self-contained cooking apparatus of FIG. 8 in another partially disassembled condition.
Figure 12:
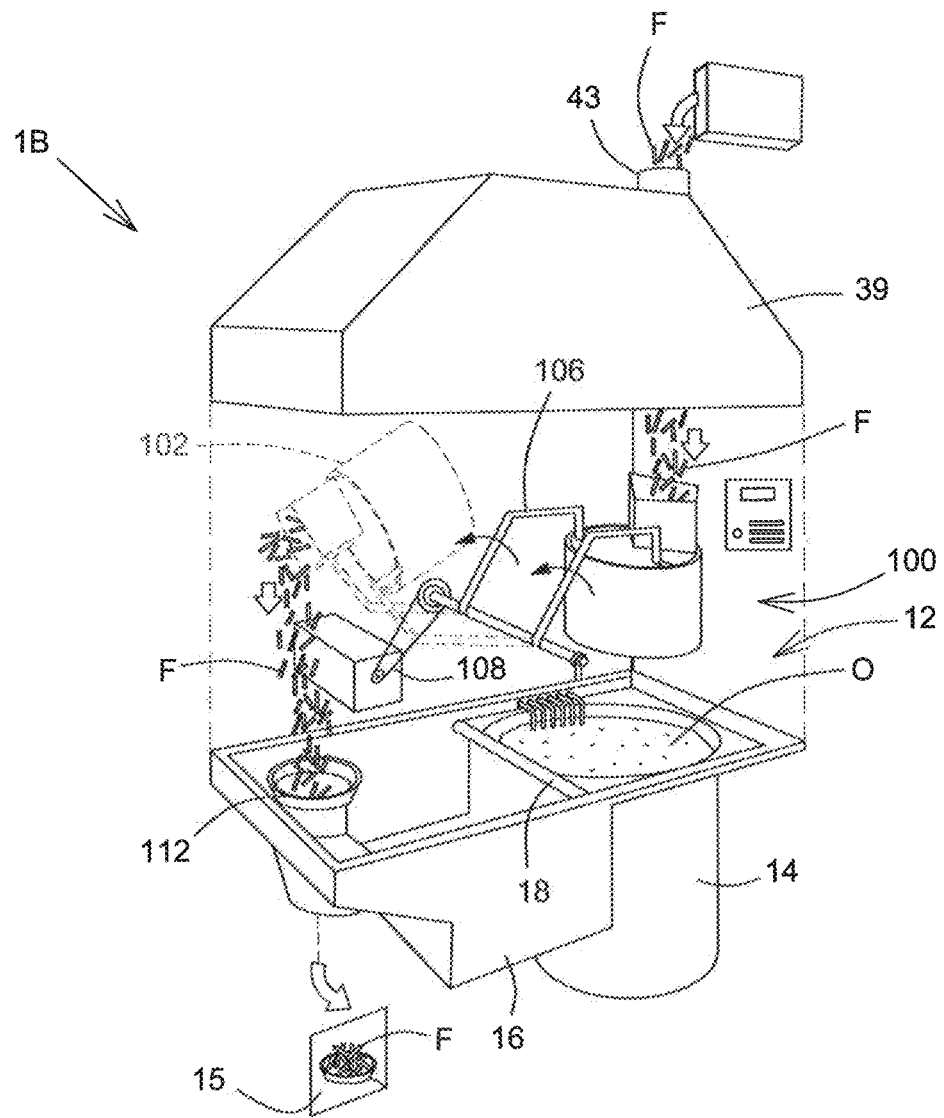
FIG. 12 is a perspective partially exploded view of the top kitchen portion including a basket assembly of the self-contained cooking apparatus of FIG. 8.

As shown in FIGS. 9 and 12, the oil vat 14 is configured to receive an automated mobile basket assembly 100. Such baskets are known in the art, for example, U.S. Pat. No. 5,275,092 teaches a carousel comprising a basket for containing food product therein. In the example shown in FIG. 12 the basket assembly 100 includes a basket 102 and mobile arms 106 actuated by motor gears 108 (see also FIG. 11). As shown in FIG. 12, the basket 102 is positioned outside the oil vat 14 and receives uncooked or frozen food product via an the bottom end 110 (see FIG. 18) of the in-feed 43 and is then moved into the oil vat 14 for cooking the product therein within the oil vat 14. Once the food product F is cooked, the basket 102 is raised (as shown in FIGS. 9 and 12) and cooked food product F is dropped into an outlet funnel 112 and dispensed via the discharged outlet 15 to be served. In an embodiment, the automated mobile basket 100 is part of a robotic assembly comprising a robotic movement imparting device for imparting a predetermined movement to the basket during operation of the present assembly 10.

Figure 10:
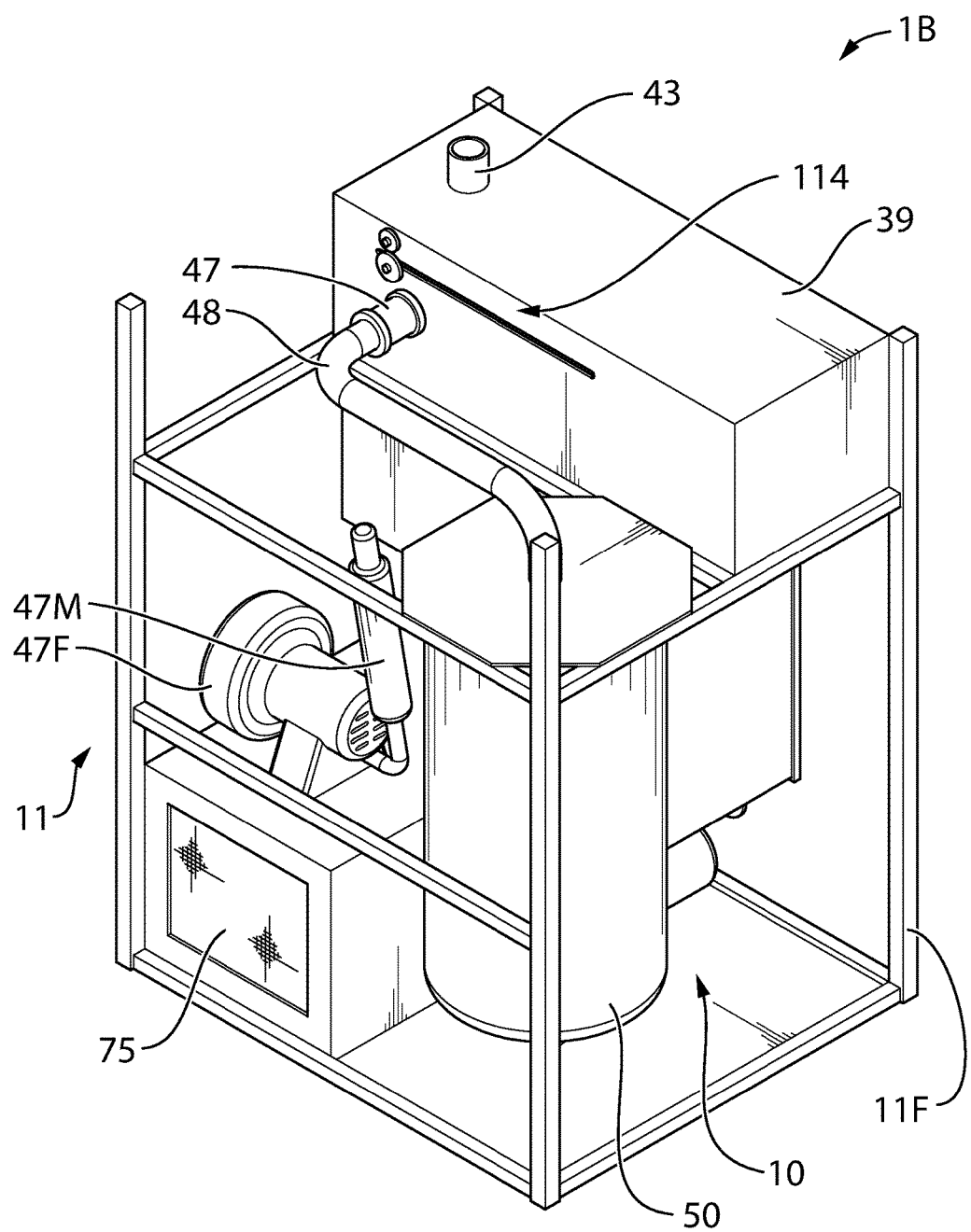
FIG. 10 is a perspective view of the self-contained cooking apparatus of FIG. 8 in a further partially disassembled condition.

Turning to FIG. 10, the apparatus 1B includes a release mechanism 114, which can be automated that provides for quickly releasing a closure (not shown) above the bottom 110 of the funnel 43 thereby allowing the food product F fall into the basket 102.

Figure 14:
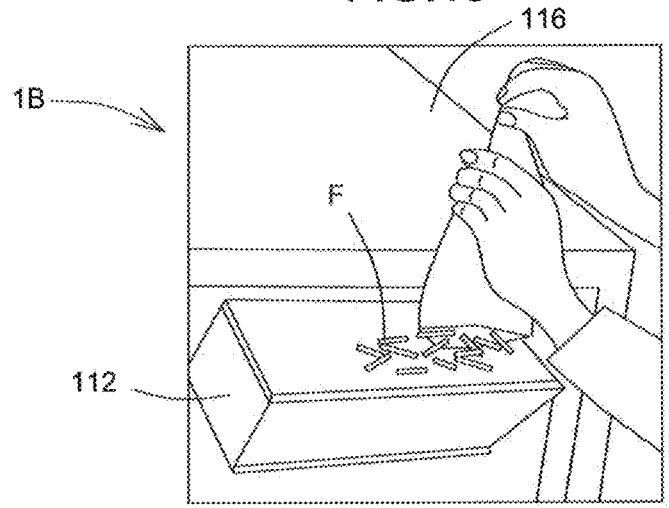
FIG. 14 is a front perspective view of a food product compartment positioned over the inlet funnel of FIG. 13 in accordance with a non-limiting illustrative embodiment of the present disclosure.
Figure 15:
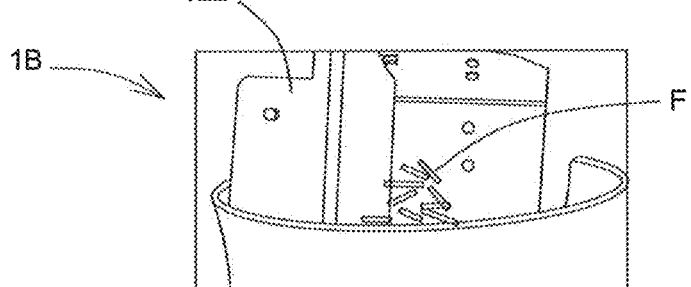
FIG. 15 is a front view of the compartment of FIG. 14 dropping food product in the inlet funnel of FIG. 13 in accordance with a non-limiting illustrative embodiment of the present disclosure.
Figure 16:
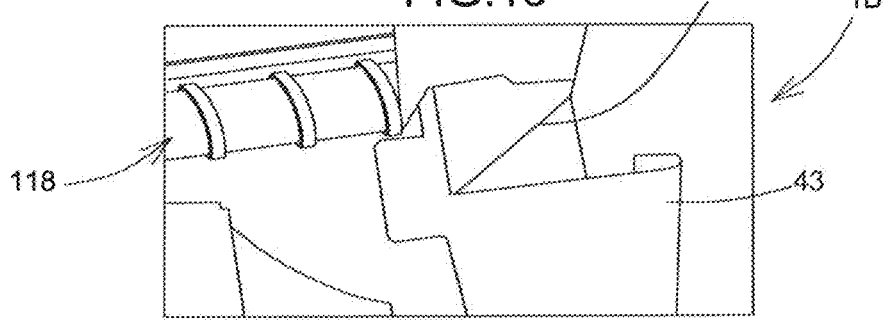
FIG. 16 is a perspective view of the discharging mechanism of the compartment of FIG. 14 for dropping food product in the inlet funnel of FIG. 13 in accordance with a non-limiting illustrative embodiment of the present disclosure.
Figure 17:
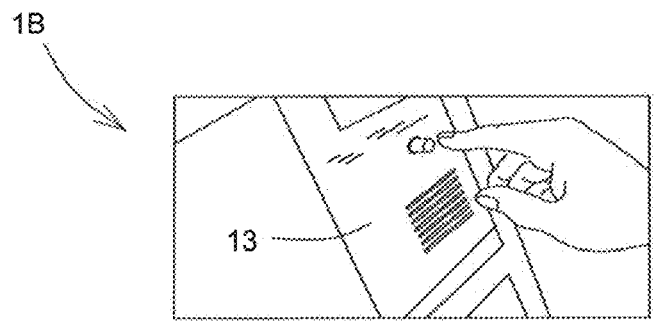
FIG. 17 is front perspective view of the operating panel of the self-contained cooking apparatus of FIG. 8 in accordance with a non-limiting illustrative embodiment of the present disclosure.
Figure 18:
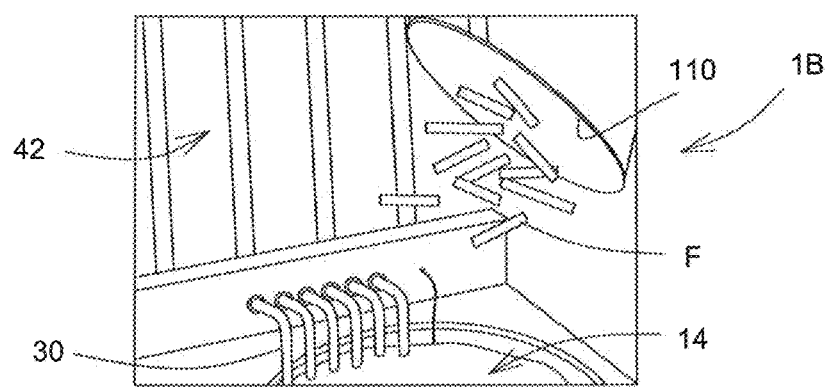
FIG. 18 is perspective view of the bottom end of the inlet funnel of FIG. 13 for dropping food product into the oil container of the self-contained cooking apparatus of FIG. 8 in accordance with a non-limiting illustrative embodiment of the present disclosure.
Figure 19:
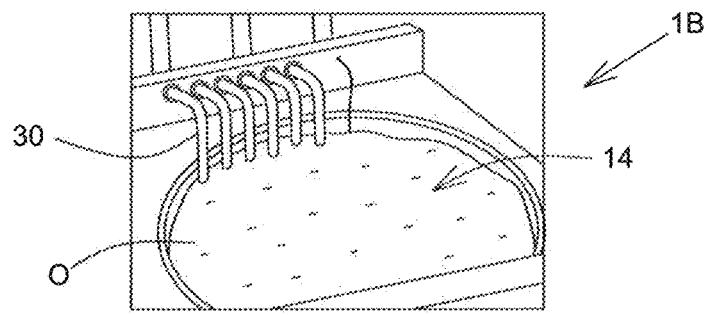
FIG. 19 is a top perspective view of the vat, containing oil therein, of the oil container of the self-contained cooking apparatus of FIG. 8 in accordance with a non-limiting illustrative embodiment of the present disclosure.
Figure 20:
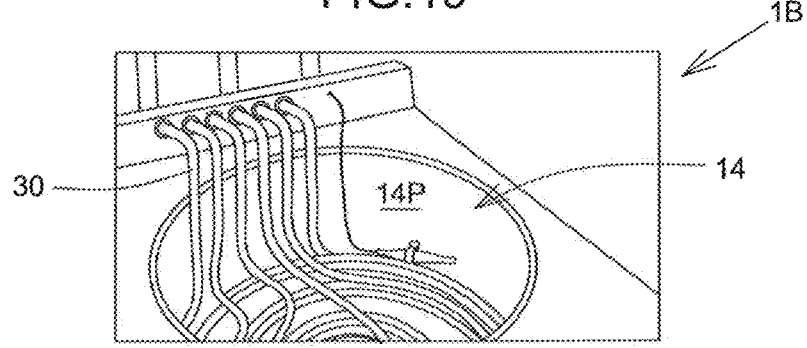
FIG. 20 is a top perspective view of the vat of FIG. 19 without oil therein in accordance with a non-limiting illustrative embodiment of the present disclosure.

In another embodiment, shown in FIGS. 14, 15 and 67, a compartment 116 is placed over the housing 11. The compartment 116 includes a receiving drawer for receiving the frozen food product F therein and maintains it therein in frozen form. A release system 118 including a rotating rod 120 and a guide chute 122 provides for automatically releasing a predetermined amount of frozen food product F in the funnel 43.

Figure 13:
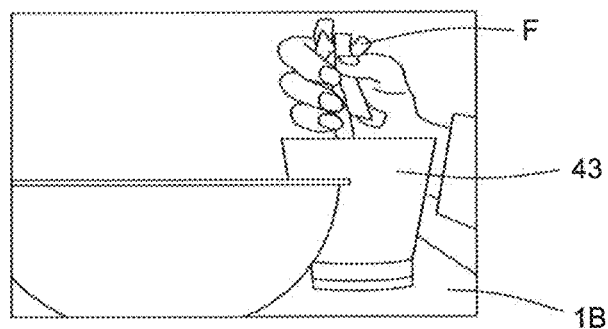
FIG. 13 is a front view of the inlet funnel of the self-contained cooking apparatus of FIG. 8.

Therefore, as explained above, the assembly 10 is housed within a housing unit 11 and frozen food product F is fed to the unit 11 as shown in FIGS. 13 to 15, the user activates the cooking process via control panel 13 (shown in FIGS. 3, 5 and 17) and after only several minutes, cooked food is discharged from the slot 15 ready to be served. The foregoing is achieved without releasing fumes into the ambient air.

The compartment 116 allows the user to simply and automatically select an amount of food product F that is to be cooked and served, for example, a small, medium, large or extra-large serving of fries. This amount can be selected via a controller C (see FIGS. 23 and 24) discussed below.

A benefit of using an enclosed unit or sealed kitchen as described above is that oxygenation of the oil is minimized.

FIGS. 3, 8, 9 and 12 show the hood assembly 39 positioned above the oil container 12. The hood assembly 39 comprises a baffle filter 42 (see FIGS. 4 and 18), the inlet funnel 43, a control panel 13, and a front access door and opening 45.

Thus the hood 39 encloses the oil container 12 and provides a space above container 12. In one example, this space represents an area of about 3 cubic feet (i.e. the kitchen area). The housing structure 11 (including hood 39) defining the aforementioned kitchen area is sealed with the exception the in-feed 43 and out-feed 15 openings which allows for constant return of make-up air (50-60 CFM) and maintains negative pressure in the kitchen.

In one example, food products are fed into a receiving in-feed chamber formed in the housing, this receiving chamber includes an in-feed closure and an out-feed closure. When feeding the receiving chamber, the in-feed closure is open, thereby exposing the receiving chamber to the ambient environment. Once the feed process is complete, the in-feed closure is closed. In an embodiment, the out-feed opening may also have a closure that is selectively opened. In such a case, the housing may have another additional opening for allowing air into the kitchen air as discussed above. As such, in this case, once the in-feed closure is closed, this out-feed closure is opened in order to allow the food product to be emptied into the basket. The foregoing minimizes oxygen from entering the kitchen area above the container 12, when feeding food product to the unit, and contaminating the cooking oil.

In still another example, the basket empties cooked food product into an out-feed receiving chamber formed in the housing structure of the unit. The out-feed receiving chamber includes first and second closures. The first closure is selectively opened to allow the basket to empty its contents into the out-feed receiving chamber. Once the basket has emptied its contents the first closure is closed and the second closure is subsequently opened to discharge the cooked food product into the ambient environment. The foregoing minimizes fumes from the cooking process escaping from the unit into the ambient air and for oxygen entering the unit during discharge. Of course, as previously mentioned, the discharge outlet or out-feed may be provided without a closure to allow for constant inflow of air.

In another embodiment, the out-feed opening does not have a closure. As such, the robotically controlled basket unloads fried product through the outlet/out-feed opening and into a dump station within the housing unit. The out-let serves a dual purpose: namely uninterrupted dumping of product and continuous air flow into the kitchen to maintain negative pressure. The foregoing prevents fumes escaping into the ambient air while the fryer is in operating mode. Should the exhaust system experience a break-down, the complete unit will automatically shut-down through a computer command.

Turning to FIG. 10, the area directly above the oil vat 14 includes a suction system 47 positioned at an opening of the exhaust hood 39 for suctioning the air above the oil vat 14. The kitchen area is in negative mode and exhausts contaminated air through a multi-stage filter system 40 (see FIG. 4). In one embodiment, the kitchen exhausts 50-60 CFM of contaminated air.

With reference to FIG. 4, the multi-stage filter system 40 comprises a baffle filter 42, a chiller unit or condenser 44, and a carbon filter 46, The chiller unit or condenser 44 (the terms "chiller unit" and "condenser" are used interchangeably) provides for emulsifying or solidifying grease parceled by means of cold water (for e.g. 42° F.) shower over marbles. This water may be recirculated or simply dispensed. In an embodiment, the baffle filter 42 is located in the hood assembly 39 (as explained above, see FIG. 3) and serves to draw contaminated air (900 FPM) from the surface of the oil vat 14.

The baffle filter 42 is positioned at the hood 39 and serves to catch particles such as grease particles and water mist that are suctioned from the kitchen area. Once the air is filtered through the baffle filter 42, it flows into an air conduit 48 which brings the air to the condenser 44.

More particularly and with reference to FIG. 10, the suction 47 described above is produced by a fan 47F which includes a muffler 47M for muffling the sound of the fan 47F. The fan 47F produces the suction force at baffles 42 and provides for air to enter into conduit 48 (shown in FIGS. 4 and 10).

Figure 21:
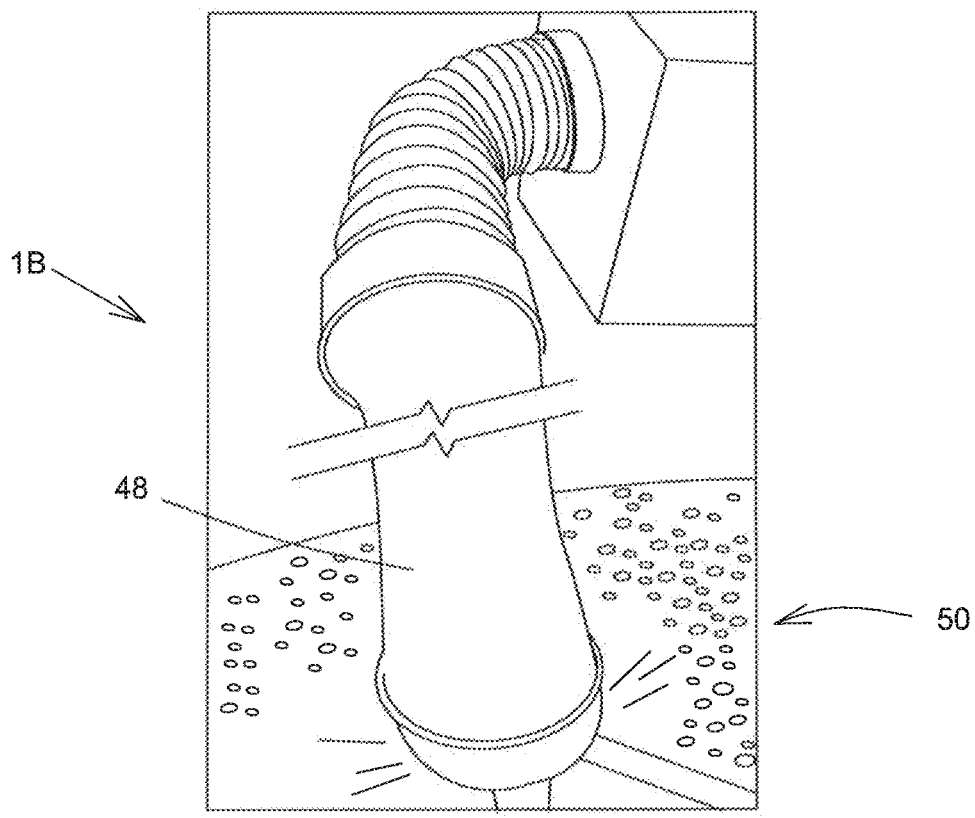
FIG. 21 is a broken perspective top view of a part of the multi-stage filter system of the self-contained cooking assembly of the apparatus of FIG. 8, showing the conduit that provides air from a baffle to a scrubber in accordance with a non-limiting illustrative embodiment of the present disclosure.
Figure 22:
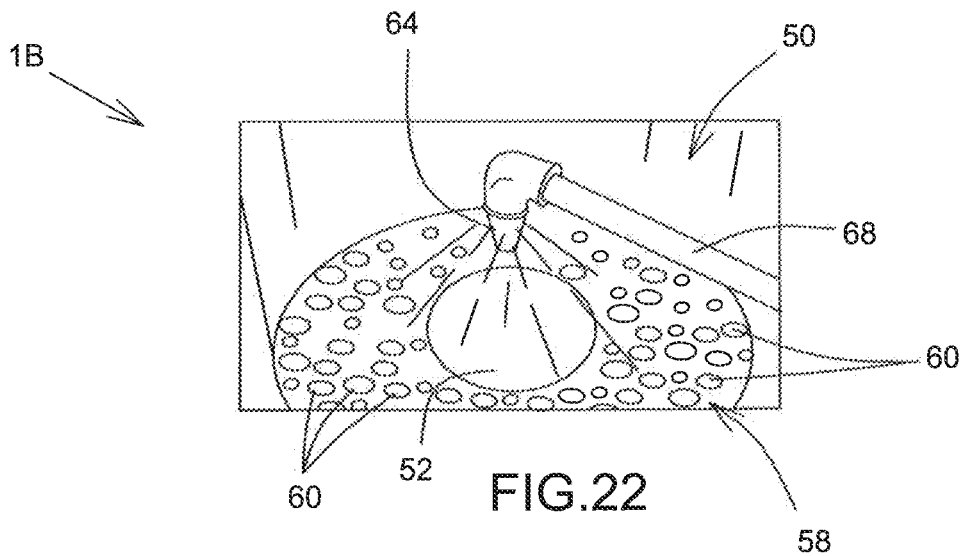
FIG. 22 is a perspective top view of the scrubber of multi-stage filter system of the self-contained cooking assembly of the apparatus of FIG. 8; in accordance with a non-limiting illustrative embodiment of the present disclosure

Turning back to FIG. 4, the condenser 44 comprises a scrubbing tower 50. In one embodiment and shown in FIGS. 8 and 10, the scrubbing tower 50 comprises a cylinder. With reference to FIGS. 4, 21 and 22, conduit 48 is in fluid communication with a central channel 52 formed in within the scrubbing tower 50 that leads towards a bottom area 54 delimited by floor 57 of the tower 50. Thus air is brought via the conduit 48 and the channel 52 to the bottom area 54. The air at the bottom area 54 moves upwardly into an outer channel 58 formed in the tower 50 and circumscribing the central channel 52. The outer channel 58 includes condensing elements 60 in the form of balls piled up within the outer channel and resting on a floor 61 such as stainless mesh floor which keeps elements above the water surface 56 discussed below. In one embodiment, these balls 60 are glass marbles.

A water circuit 62 is positioned adjacent the outer tower and comprises a nozzle 64 at its free for spraying the glass marbles 60 with cold water. The cold water flows along the glass marbles 60 towards the bottom area 54 of the outer channel 58 and is limited by floor 57, the water rises from there and a pipe 59 provides for evacuating the water overflow in order to maintain the water surface at surface level 56. A pump 66 (also shown in FIG. 9) mounted to the water circuit 62 pumps the water from the outer channel 58 into the conduit 68 of the circuit 62 and towards a chiller 70 which cools down the water to continue its flow via conduit 68 so as to be sprayed onto the glass marbles 60 via nozzle 64.

In an embodiment and as shown in FIGS. 8 and 9, the chiller 70 comprises a 10,000 BTU compressor 71 and maintains water at 42F. A cowling 69 is positioned above compressor 71 to protect the internal cabinet of the housing 11 from heat dissipation. FIGS. 10 and 11 show a grid 75 through which heat produced from the chiller 70 is evacuated.

Cold water is thus continuously recirculated onto the glass marbles 60.

The air that passes upward through the outer channel 58 flows through the pile of cold glass marbles 60. The spherical surface of the glass marbles 60 increases the condensing surface area thereby increasing the efficiency of condensation of the air passing therethrough. As such the air coming up the outer channel drops in temperature and releases its water content, moreover the glass marbles 60 act as grease traps.

Thus the air is filtered through the condenser 44 having been cooled down and released its water, grease and odours, flows into conduit 72 (also shown in FIG. 8) which leads the air to the carbon filter 46.

Referring again to FIG. 4, in an embodiment, the carbon filter 46 includes a container 74 comprising charcoal 76 therein that provides for micro-porous absorption of particles in the air that passes through the container 74. In an embodiment, the charcoal 76 is coconut charcoal. In an embodiment, the coconut charcoal 76 is activated coconut charcoal. Thus the remaining odors are removed from air and the clean air flows into conduit 78 where it is lead to a compressor 80.

The compressor 80 is a ring compressor provides for moving the clean air back into the system 10 to circulate therein.

Certain non-limiting features and advantages of the present assembly and system therefore including processes therefore will be discussed below so as to further exemplify assembly 10.

A hands free system is provided for continuously filtering the oil after every serving as there is no manual intervention for frying time and temperature, thus avoiding overloading the basket due to portion control. Moreover, the portion control of the food product maintains a constant temperature and minimizes oil absorption. The vat over-flow design removes floating crumbs while maintaining optimum frying temperature. The heating element is designed with minimum watts per square inch of surface, reducing scorching and hot spots. The ratio of total element wattage to oil volume is designed to maintain optimum frying temps throughout the cooking cycle. The multi-stage filter which consists of a sieve, sifter, strainer, screen, mesh filter and the like provides for collecting floating crumbs. The subsequent filter provides a replaceable cartridge. The oil filtering process provides for maximizing the life of shortening. The breakdown of oil is attributed to element scorching, aeration, high frying temp and salting and product residue floating in the oil. The foregoing is substantially avoided by the present process.

The enclosed kitchen area minimizes aeration. The present assembly avoids air pollution, for example, a commercial open vat fryer of comparable size (30 lbs of oil) would require a minimum of 900 CFM of exhaust air to the atmosphere through a kitchen hood, ducting and roof fan. The grease vapours from the sealed kitchen are drawn through a baffle filter, a scrubber/quenching tower of cold water and a replaceable charcoal filter. In an embodiment, this multi-stage system purifies the air down to 0.3 microns of particulate matter and odors and is approved for use in a non-ventilated atmosphere. Thus the need for conventional exhaust hood, fan and make-up air system is eliminated.

In an embodiment, the apparatus unit is on castors and can be operated from any commercial location with no means of exhaust to the outside.

In an embodiment, the main components of the assembly (basket, air and oil filters) are fully integrated.

In an embodiment and as shown in FIG. 22, a controller C, such as a built-in processor (e.g. a computer) which can be linked to a wired or wireless control panel (tablet, smartphone, computer, etc.) is programmed to perform all aspects of the frying operation as it relates to a non-ventilated, self-contained frying apparatuses, generally denoted 1C in FIG. 22 and described above by way of non-limiting examples.

In an embodiment, the controller C selectively linked to the various components of the assembly 10 to receive information therefrom and to send signal commands thereto for control thereof. In an embodiment, the assembly 10 comprises electro-mechanical components such as motors, solenoids and heaters. In addition various readers indicate the position of many components during their specific motion such as on/off, in/out or up/down. Linear inputs sense parameters that vary in time such as, for example, angles, temperature and weight. The foregoing components can be inked to the controller C. The controller C provides for managing the operations needed to perform all the steps in the present frying method or process.

In an embodiment, all the moving parts or heating elements of the assembly 10 are driven by solid-stated switches that are turned 'On' or 'Off' by the controller. The various inputs are read by the controller and the program running the controller acts accordingly and sends the appropriate signal. The controller also reads linear inputs (having a linear value for example between 0 to 100%); this used for example, in temperature reading and linear positioning (of the basket for example).

Figure 23:
FIG. 23 is a schematic representation of a controller being linked to a self-contained cooking apparatus 1C including the self-contained cooking assembly of FIGS. 1-4, in accordance with a non-limiting illustrative embodiment of the present disclosure.
Figure 24:
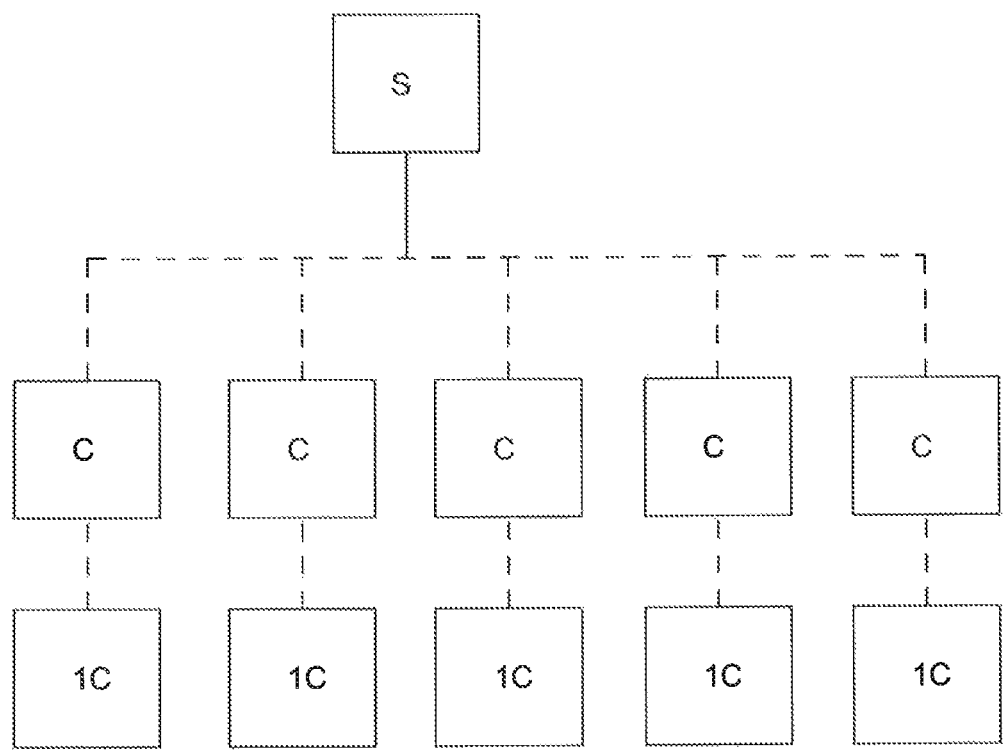
FIG. 24 is a schematic representation of a server linked to a plurality of the controllers of FIG. 23, in accordance with a non-limiting illustrative embodiment of the present disclosure.

In an embodiment shown in FIG. 23, one or a plurality of controllers C is linked to a remote server S providing for private data exchange. As such, the controller C is accessible from any location to read information and also to make specific upgrades of the program. This feature is very valuable when the fryer (assembly 10) is part of a private group and the group seeks to monitor global statistical information to improve the operation of the assembly 10. The foregoing can also be used for a worldwide service plan and/or global monitoring.

The program running the controller C takes into account a variety of factors such as response time between an input command and a output execution from a component of the assembly 10, the level of performance of the various mechanisms used in the assembly 10 and the like. Thus, the controller C provides a user or operating for assessing the performance of the assembly 10.

The present assembly and system therefore provides for the elimination of a kitchen exhaust system, elimination of air pollution, reduced energy consumption, lower insurance costs, reduced labour and operating costs while providing consistent quality fried products in less than 1 minute serving time and substantially avoiding food waste.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A cooking apparatus comprising:
a housing enclosure defining closed top and bottom ends, closed lateral sides and closed front and rear sides, the housing including an inlet for receiving food product near the top end thereof and an outlet for dispensing cooked food product near the bottom end thereof, the housing comprising an internal frame structure and a hood enclosure defining the top end of the frame;
a closed-circuit hands-free cooking assembly positioned within the housing and mounted to the internal frame structure, the cooking assembly comprising:
a container for receiving cooking fluid therein and comprising a vat and a reserve tank in fluid communication with the vat, the vat comprising a top open end that is adjacent a top open end of the reserve tank, a passage being interposed between the top open ends of the vat and the reserve tank, wherein the vat is purposely designed to overflow such that overflow of cooking fluid from the vat continuously and automatically flows into the reserve tank via the passage thereby continuously renewing the cooking fluid between cooking cycles and avoiding overheating the cooking fluid in the vat, the vat being positioned near the top end of the housing and comprising a cylindrical configuration that substantially eliminates hot spots, wherein the reserve tank does not include a heating element thereby cooking fluid received therein is not heated, wherein the cooking fluid in the vat is maintained at a predetermined optimal frying temperature for one cooking cycle before overflowing into the reserve tank;
a heating element mounted within the vat for heating the cooking fluid therein for cooking a food product, the heating element is configured to provide uniform heat density throughout the vat thereby avoiding hot spots;
a filtering system mounted within the reserve tank for filtering the cooking fluid received from the vat; and
a conduit in fluid communication with the reserve tank and the vat for selectively returning the cooking fluid to the vat from the reserve tank, thereby causing cooking fluid in the vat prior to the returned cooking fluid to overflow from the vat into the reserve tank,
wherein the cooking fluid returning to the vat from the reserve tank has not been heated within the reserve tank subsequently to having been heated by the heating element in the vat and has been filtered by the filtering system;
a robotic assembly positioned within the housing and mounted to the internal frame structure frame and comprising:
a movable basket near the top of the housing for receiving food product from the inlet and for moving the food product therein in and out of the vat for a cooking cycle thereof and for dropping the cooked food product to the outlet via a funnel for dispensing thereof;
a movement imparting device for imparting a movement to the movable basket; and
a control panel positioned outside the housing and being in operational communication with the cooking assembly and the robotic assembly;
wherein the hood enclosure is positioned above the container and defines a space above the container, the hood enclosure being configured for: (i) preventing cooking fluid fumes from escaping into the ambient air outside the housing, (ii) minimizing oxygenation of the cooking fluid; (iii) allowing constant return of make-up air; and maintain negative pressure in the space above the container.

2. A cooking apparatus according to claim 1, wherein the filtering system includes a sieve for catching particles from the oil flowing from the vat.

3. A cooking apparatus according to claim 1, wherein the filtering system includes a filter canister containing a cotton cartridge for filtering the cooking fluid.

4. A cooking apparatus according to claim 1, further comprising a baffle filter for receiving and filtering the air above the container during cooking.

5. A cooking apparatus according to claim 4, further comprising a condenser in fluid communication with the baffle filter for condensing the air received from the baffle filter.

6. A cooking apparatus according to claim 5, wherein the condenser comprises a scrubbing tower for passing the air from the baffle filter therethrough, the scrubbing tower defining a channel containing therein condensing elements, a water circuit being positioned above the condensing element for spraying the condensing elements with water.

7. A cooking apparatus according to claim 6, wherein the scrubbing tower has a central channel for passing the air from the baffle filter therethrough towards a floor of the scrubbing tower, and an outer channel containing the condensing elements for receiving the air from the floor therethrough thereby providing the air from the floor to drop in temperature and be filtered by the condensing elements.

8. A cooking apparatus according to claim 6, wherein the condensing elements are glass marbles.

9. A cooking apparatus according to claim 7, further comprising a pump for pumping water from the floor of the scrubbing tower through a chiller for re-spraying the water on the condensing elements.

10. A cooking apparatus according to claim 5, further comprising a carbon filter in fluid communication with the condenser for filtering the air received from the condenser.

11. A cooking apparatus according to claim 10, wherein the carbon filter comprises a container and carbon therein providing for absorption of particles in the air passing therethrough.

12. A cooking apparatus according to claim 10, wherein the charcoal is activated charcoal.

13. A cooking apparatus according to claim 1, further comprising a basket assembly, the basket assembly comprising a movable basket for receiving food product therein, the movable basket being automatically movable into and out of the vat.

* * * * *